(12) United States Patent
Brown et al.

(10) Patent No.: US 10,990,488 B1
(45) Date of Patent: Apr. 27, 2021

(54) SYSTEM AND METHOD FOR REDUCING FAILOVER TIMES IN A REDUNDANT MANAGEMENT MODULE CONFIGURATION

(71) Applicant: DELL PRODUCTS, LP, Round Rock, TX (US)

(72) Inventors: Michael E. Brown, Austin, TX (US); Joshua M. Pennell, Pendleton, OR (US); Henry Pang, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 6 days.

(21) Appl. No.: 16/712,036

(22) Filed: Dec. 12, 2019

(51) Int. Cl.
*G06F 11/00* (2006.01)
*G06F 11/20* (2006.01)

(52) U.S. Cl.
CPC ...... *G06F 11/2028* (2013.01); *G06F 11/2038* (2013.01); *G06F 11/2043* (2013.01); *G06F 2201/805* (2013.01); *G06F 2201/82* (2013.01)

(58) Field of Classification Search
CPC ............ G06F 11/2028; G06F 11/2038; G06F 11/2043; G06F 11/2046
See application file for complete search history.

(56) References Cited

U.S. PATENT DOCUMENTS

| | | | |
|---|---|---|---|
| 9,424,148 B2 | 8/2016 | Brundridge et al. | |
| 2010/0146592 A1* | 6/2010 | Gamare | H04L 41/0695 726/4 |
| 2015/0301913 A1* | 10/2015 | Gomi | G06F 11/2038 714/6.2 |
| 2016/0203159 A1 | 7/2016 | Tran | |
| 2017/0286324 A1* | 10/2017 | Taki | G06F 11/076 |

* cited by examiner

*Primary Examiner* — Michael Maskulinski
(74) *Attorney, Agent, or Firm* — Larson Newman, LLP

(57) ABSTRACT

While the management module of an information handling system is set as a standby module, an enclosure controller provides first requests for attribute data of the information handling system, and receives and stores first response data for attribute data associated with a first subset of the first requests in a local memory of the enclosure controller. The enclosure controller receives request failure responses associated with a second subset of the first requests directed to a subset of the attributes data for the information handling system stored in a shared memory. While the management module is set as an active module, the management module is granted access to the shared memory. The enclosure controller provides retry requests for attributes associated with the request failure responses, and receives and stores second response data associated with the retry requests in the local memory.

20 Claims, 4 Drawing Sheets

SYSTEM AND METHOD FOR REDUCING FAILOVER TIMES IN A REDUNDANT MANAGEMENT MODULE CONFIGURATION

FIELD OF THE DISCLOSURE

The present disclosure generally relates to information handling systems, and more particularly relates to reducing failover times in a redundant management module configuration.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements may vary between different applications. Thus information handling systems may also vary regarding what information is handled, how the information is handled, how much information is processed, stored, or communicated, and how quickly and efficiently the information may be processed, stored, or communicated. The variations in information handling systems allow information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, graphics interface systems, data storage systems, networking systems, and mobile communication systems. Information handling systems may also implement various virtualized architectures. Data and voice communications among information handling systems may be via networks that are wired, wireless, or some combination.

SUMMARY

A shared memory may store first attributes for an information handling system and a management module. While the management module is set as a standby module of the information handling system, an enclosure controller may provide first requests for attribute data of the information handling system, and may receive and store first response data for attribute data associated with a first subset of the first requests in a local memory of the enclosure controller. The enclosure controller may receive request failure responses associated with a second subset of the first requests directed to a subset of the attributes data for the information handling system stored in the shared memory. While the management module is set as an active module of the information handling system, the management module is granted access to the shared memory. The enclosure controller may provide retry requests for attributes associated with the request failure responses, and may receive and store second response data associated with the retry requests in the local memory.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
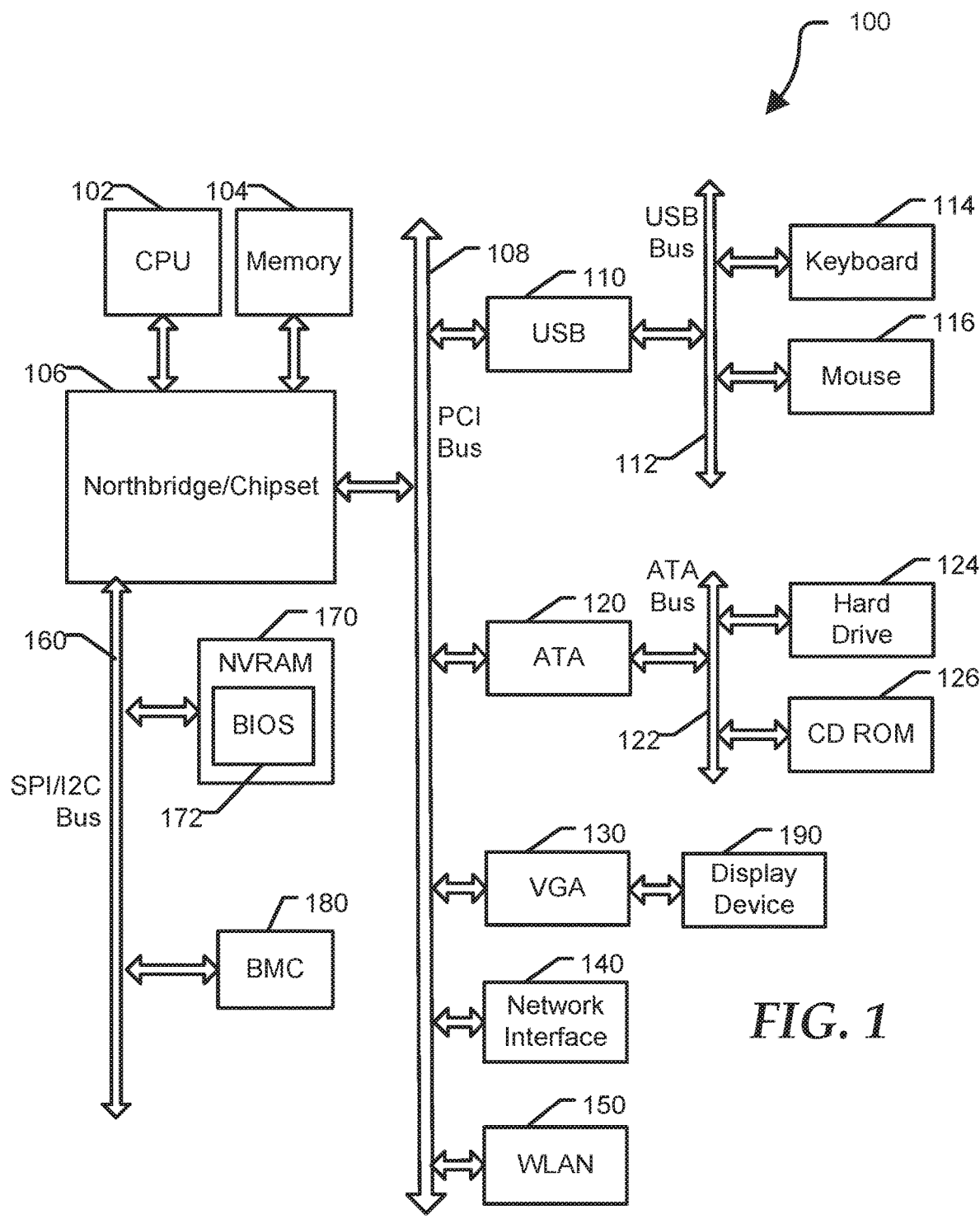
FIG. 1 is a block diagram of a general information handling system according to at least one embodiment of the disclosure.

FIG. 1 illustrates a general information handling system 100 including a processor 102, a memory 104, a northbridge/chipset 106, a PCI bus 108, a universal serial bus (USB) controller 110, a USB bus 112, a keyboard device controller 114, a mouse device controller 116, a configuration an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a NVRAM 170 for storing BIOS 172, and a baseboard management controller (BMC) 180. In an embodiment, information handling system 100 may be information handling system 300 of FIG. 3. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional buses, not shown for clarity. For example, system 100 can include multiple processor cores, audio devices, and the like. While a particular arrangement of bus technologies and interconnections is illustrated for the purpose of example, one of ordinary skilled in the art will appreciate that the techniques disclosed herein are applicable to other system architectures. System 100 can include multiple CPUs and redundant bus controllers. One or more components can be integrated together. For example, portions of northbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. For example, device controller 130 may provide data to a display device 190 to visually present the information to an individual associated with information handling system 100. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 100 can include a set of instructions that can be executed to cause a processor or circuitry of the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

Figure 2:
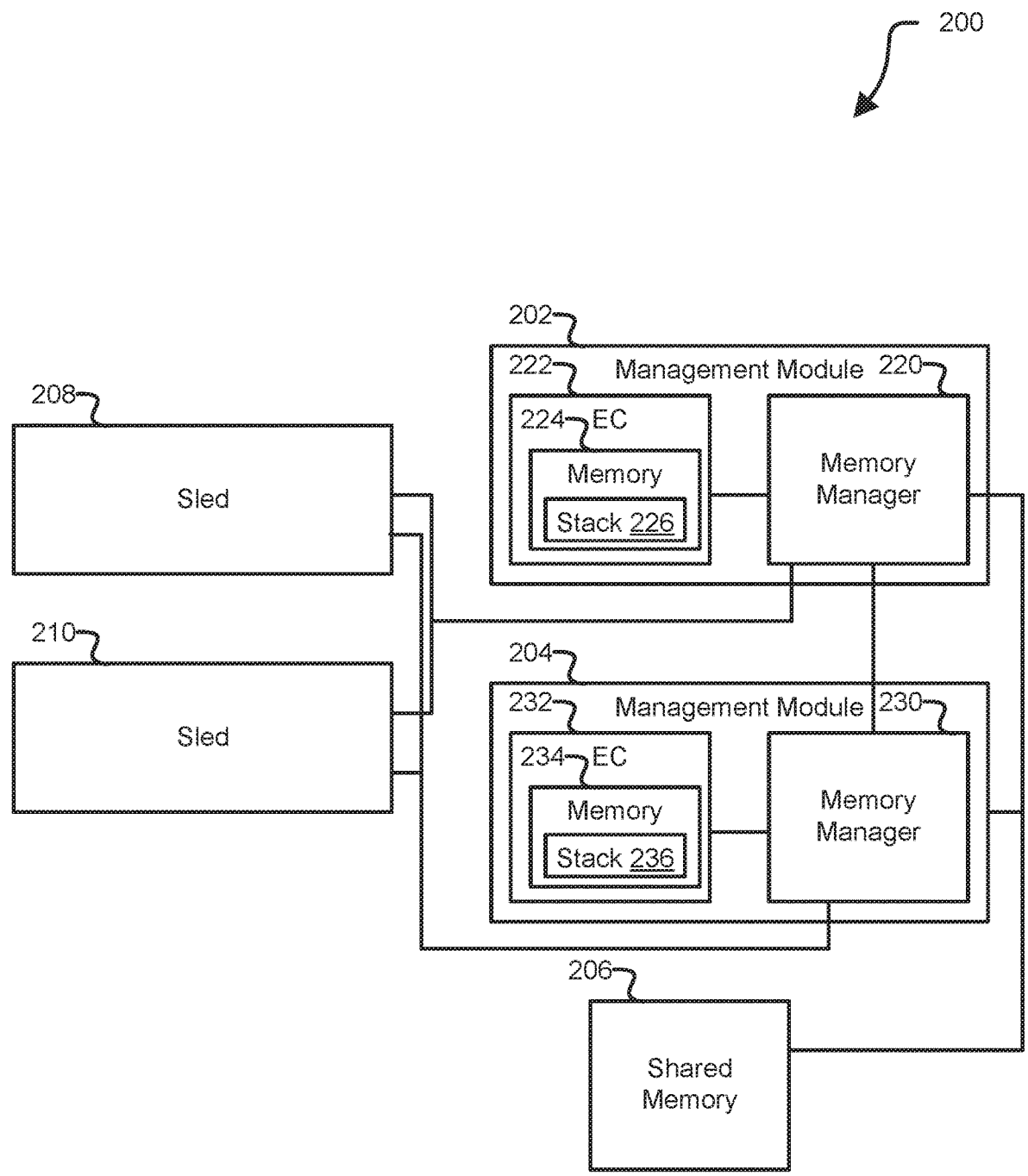
FIG. 2 is a block diagram of a portion of an information handling system including a redundant management module configuration according to at least one embodiment of the disclosure.

FIG. 2 shows a portion of an information handling system 200 for reducing failover between management modules 202 and 204 according to at least one embodiment of the disclosure. Information handling system 200 includes management modules 202 and 204, a shared memory 206, and sleds 208 and 210. Management module 202 includes a memory manager 220, an enclosure controller 222, and a memory 224 to store a stack 226. Management module 204 includes a memory manager 230, an enclosure controller 232, and a memory 234 to store a stack 236. In an embodiment, each of memory managers 220 and 230 may be any suitable memory manager including, but not limited to, a MegaRAID Storage Manager (MSM). In an embodiment, each of stacks 226 and 236 may be any suitable stack including, but not limited to, a Representational State Transfer (REST) stack for a REST interface. In certain examples, stacks 226 and 236 may include a complete representation of the system state, such as a state of information handling system 200, that the stack tracks. In an example, sleds 208 and 210 may include any suitable components of a server sled, such as a server, one or more processors, one or more memory devices, one or more fans, one or more PCIe devices, or the like. In an embodiment, information handling system 200 may be utilized to provide any suitable service servers including, but not limited to, Internet webpage servers, storage servers, and compute servers.

Information handling system 200 may be employed, in whole or in part, by information handling system 100 illustrated in FIG. 1, or any other system, device, component, etc. operable to employ portions, or all of, the information handling system. In an example, information handling system 200 may include more components than shown in FIG. 2 without varying from the scope of this disclosure.

Operation of a management module, such as management module 202 or 204, may be described with respect to one of the management modules or the other. One of ordinary skill will recognize that the description with respect to management module 202 or 204 or their components may be applied to the other management module and components without varying from the scope of this disclosure. During operation, enclosure controller 222 may include a stack or set of instructions, such as stack 226 stored within memory 224. Memory manager 220 may access and utilize stack 226 to communicate with and request actions from enclosure controller 222. In an example, stack 226 may include a data pump process, which feeds a stream of events into the stack. Enclosure controller 222, via the stack, may then process each event to modify a saved state.

Based on this configuration, stack 226 may need to have a complete set of system events to build the complete state of stack tree before the stack may serve accurate data from this interface to memory manager 220. In an example, the stream of events needed by stack 226 may include any suitable events including, but not limited to, events representing current attribute values for each of the attributes on enclosure controller 222. In certain examples, enclosure controller 222 may include any suitable number of attributes including, but not limited to, 2500 attributes, 3000 attributes, 3500 attributes, 4000 attributes, and 4500 attributes. In an embodiment, the attributes may be associated with different components and/or states of information handling system 200. In an example, execution of a data pump may cause the attributes to be read and sent to stack 226. In an embodiment, this operation of reading and sending the attributes may take about 130 seconds. In previous information handling systems, the attributes and initial states were only read after a management module of an information handling system became active, which added 130 seconds to both the information handling system startup time as well as a failover time.

In an example, one of management modules 202 and 204 may be set up in an active mode and the other management module is set up in a standby mode. During a first boot of information handling system 200, one of management modules 202 and 204 may be established as the active module, such as management module 202. In response to management module 202 being established as the active module, this management module is the only one allowed to access a shared persistent memory location of shared memory 206. In an example, shared memory 206 may be any suitable type of memory, such as RSPI storage. Once management module 202 is active and has access to shared memory 206, an entire configuration of information handling system 200 may be accessible by enclosure controller 222. In response, processes, such as daemons, within enclosure controller 222 may signal a startup and begin reading a configuration of information handling system 200.

In previous information handling systems, based on a management module being the active module, having access to the shared memory, and the daemon processes have been initialized, an enclosure controller would be able service requests from a memory manager. The enclosure controller would then load a data pump process, which would need the complete state of the information handling system before plugins within the data pump process of the enclosure controller were in a ready state. These processes of making the enclosure controller in the ready state would create a lag between when the management module was active and the enclosure controller was in the ready state. In previous information handling systems, the lag times may increase an amount of time needed to complete a failover between management modules because the standby module would need to be active and then begin to execute the data pump process to become ready. Thus, management modules 202 and 204 may include improvements to information handling system 200, which may reduce the lag time so initialization and failover of the management modules may be reduced. Therefore, the improvements to information handling system 200 with respect to memory modules 202 and 204 will be described below.

During a startup of information handling system 200, dependencies between the start up and the data pump processes within stacks 226 and 236 may removed, such that the data pump processes may begin very early in the boot process. In an example, very early in the boot process may be any suitable point including, but not limited to, prior to most other daemons with stacks 226 and 236.

In response to the start of the boot process of memory modules 202 and 204, the data pump processes may load and run all plugins of the pump process. Thus, the plugins of the data pump process may be executed in both the active module, such as management module 202, and in the standby module, such as management module 204. In an example, the plugins themselves have unique dependencies built in, such that any capable plugin may immediately begin registering, reading, and listening for events. In certain examples, the plugins associated with attributes stored within local memory 224 or 234 may be completed regardless of whether respective management module 202 or 204 is in the active or standby module. In this example, enclosure controllers 222 and 232 of management modules 202 and 204 will always have access to their respective local memory 224 and 226, such that these plugins of the data pump within stacks 226 and 236 may be completed.

However, plugins with dependencies that are not matched, such as waiting for Datamanager to be ready, may be blocked until these requirements are met. Additionally, based on standby management module 204 not having access to shared memory 206, some attribute read requests from the pump plugin of enclosure controller 232 will fail because these attributes are stored within the shared memory. Enclosure controller 232 may record these failures future reference, such as when management module 204 becomes active. Alternatively, the attribute read requests for attributes within shared memory 206 from the pump plugin of enclosure controller 222 will be completed because management module 202 is active and has sole access to the shared memory.

In response to the processes described above for management modules 202 and 204 being completed, information handling system 200 may operate with management module 202 as the active module and management module 204 as the standby module. In an example, during operation of information handling system 200, management module 202, via enclosure controller 222 and memory manager 220, may continuously monitor sleds 208 and 210 and other components within the information handling system. These operations may result in management module 202 updating attributes stored within shared memory 206 and/or local memory 224. In an example, updated attributes may be any suitable attributes associated within components of information handling system 200 including, but not limited to, a rotations per minute (RPM) of a fan within sled 208 or 210 and an amount of power consumed within the information handling system. In an embodiment, another attribute may be a configuration attribute, which includes an inventory of components within information handling system 200. In an example, the configuration attribute may be set once, during the start-up, and not changed.

In certain examples, a failure may occur within management module 202, which may result in a failover to management module 204. The failure may be any type of failure including, but not limited to, a hardware failure or a software failure within enclosure controller 222 or memory manager 220. In an example, standby management module 204 may send ping requests to active management module 202 at predetermined intervals to determine whether a failure has occurred in management module 202. In an embodiment, the ping requests may be a heartbeat to get a return ping indicating that active management module 202 is still operating. However, in response to management module 204 determining that the heartbeat ping has not been received from management module 202 for a predetermined amount of time, management module 204 may determine that management module 202 has possibly crashed or failed.

In response to the failure of management module 202, one or more operations may be performed to complete the failover from management module 202 to management module 204. For example, management module 204 may be registered as the active module and gain the sole access to shared memory 206. In an example, management module 204 may provide a signal on hardware reset line and/or toggle a failed line between management modules 202 and 204 to ensure that management module 202 is no longer the active module. Management module 204 may send a signal to a multiplexor that controls communication line between shared memory 206 and the management modules 202 and 204. This signal may switch the multiplexor to only allow management module 204 to access shared memory 206.

In response to management module 204 becoming active, a chassis manager of information handling system 200 may send events of various state changes to the management module. In an example, in response to management module 204 becoming active, the pump plugins of stack 236 may listen for relevant events and trigger a retry of any failed requests. For example, a previously failed event that may be monitored is a shared memory mounted event, such as RSPI MOUNTED event, which triggers a re-read of any earlier failed attribute read requests. In an example, this event may cause enclosure controller 232 to read the attributes stored within shared memory 206.

In certain examples, based on the plugins of stack 236 previously registering for events, such as during start up while management module 204 was the standby module, the plugins may be immediately updated by other process events within enclosure controller 232, and the plugins may use the event data to update stack 236 without having to make requests after becoming the active module as done in previous information handling systems. For attributes stored in local memory 234 of enclosure controller 232, the standby pump plugin may be updated once the attribute change on the active is propagated to the standby memory. In an example, this attribute may be an embedded Multi-Media Controller (EMMC) based attribute.

In an example, stack 236 may have an incomplete state of information handling system 200 based on the requests made while management module 204 was the standby module. For example, configuration attributes associated with information handling system 200 are incomplete in a standby module. Based on the incomplete state, requests made by enclosure controller 232 before the controller is in the ready state would also be incorrect or incomplete. In a failover situation, memory manager 230 may have multicast Domain Name System (mDNS) announcements from both enclosure controllers 222 and 232, and the memory manager may send requests to try to identify which management module 202 or 204 is running as the active module. To keep memory manager 230 from getting incorrect data, a configuration of enclosure controller 22 may return a service unavailable response until the enclosure controller is in the ready state. For example, an Apache configuration of enclosure controller 222 may return a HTTP 503 response until the ready state is complete.

In an embodiment, the above description of the operation of management module 204 while in the standby state may greatly reduce a failover time within information handling system 200. In an example, the reduction of failover time may be any suitable amount of time including, but not limited to, reducing from 158 seconds to 23 seconds for average failover times.

In an example, failover times may be reduced further by one or more other improvements to information handling system 200. For example, while management module 204 is the standby module, enclosure controller 232 may performed one or more operations to update attributes. In an example, enclosure controller 232 may join an active cluster within information handling system 200. In response to joining the active cluster, the pump on enclosure controller 232 may contact the pump on enclosure controller 222 and request a stream mirror. In an embodiment, the stream mirror may cause the pump on enclosure controller 222 to duplicate all events from the pump to stack 226, and to provide the duplicate events to the pump of enclosure controller 232, which in turn may send the events to stack 236. In an example, the stream mirroring may be completed via an existing connection between management modules 202 and 204. In an embodiment, the connection may be any suitable connection including, but not limited to a Remote Procedure Call (RPC) connection. Based on the mirroring of events, stack 236 may contain an up-to-date, real-time copy of data within stack 226. When failover occurs, the pump within enclosure controller 232 may immediately signal that it is in the ready state.

In an example, the pre-loading attributes within stack 236 while management module 204 is the standby module may enable enclosure controller 232 to be aware of a large portion of the state of information handling system 200 prior to becoming active. In an embodiment, the pre-loading may include approximately 90% of the state of information handling system 200, such that only the remaining 10% is read after management module 204 becomes active but prior to enclosure controller 232 entering the ready state. In an example, these operations may reduce time between active and ready state by over 80% and keep enclosure controller 232 or 222 to a 30 second failover time.

Figure 3:
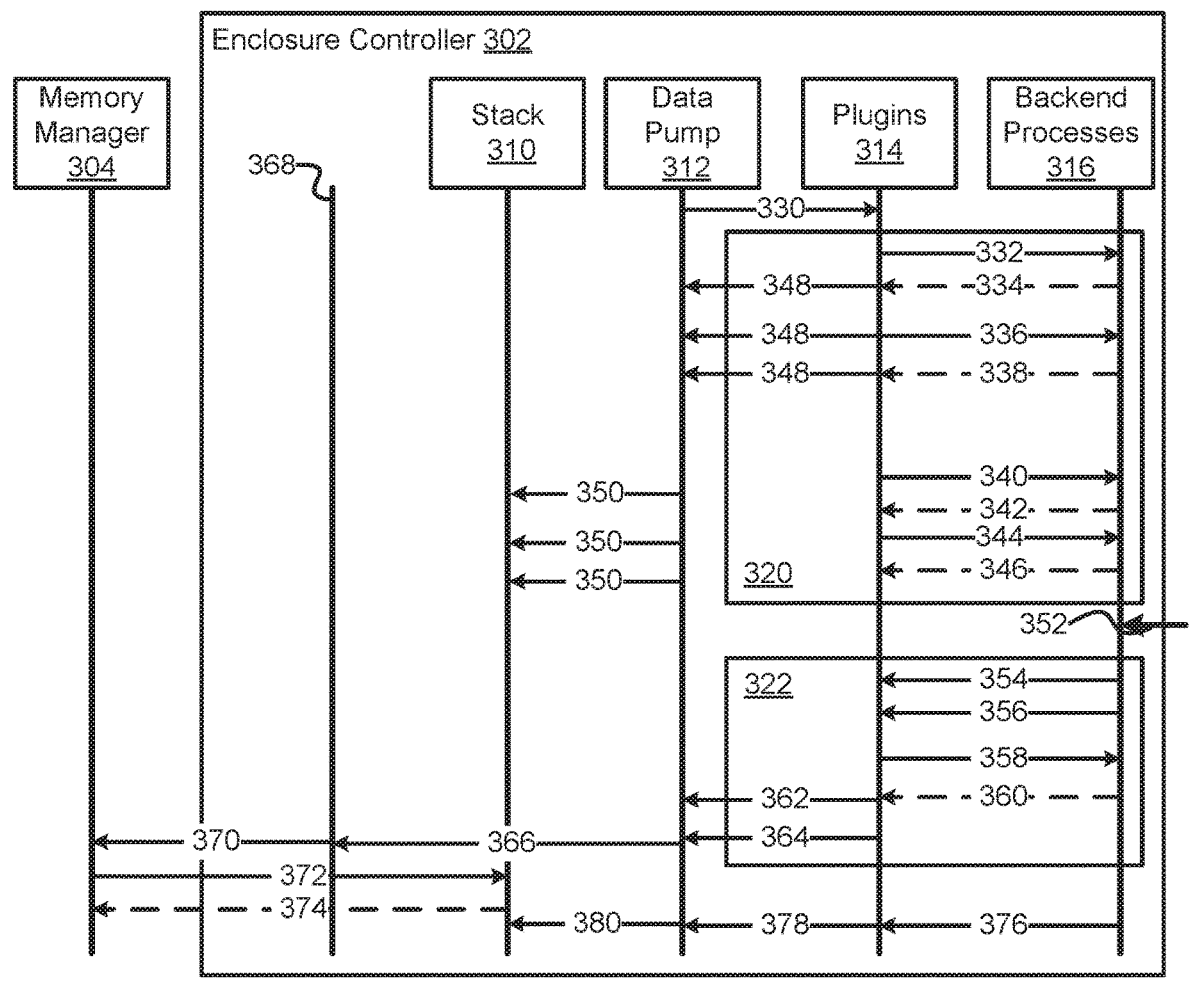
FIG. 3 is a diagram illustrating communications and events associated with components of an enclosure controller and a memory manager according to at least one embodiment of the disclosure.

FIG. 3 shows communications and events associated with components of an enclosure controller 302 and a memory manager 304 according to at least one embodiment of the disclosure. Enclosure controller 302 includes a stack 310, a data pump process 312, plugins 314 for the data pump, and backend processes 316. In an example, the communications and/or events may occur during one or more periods including, but not limited to, a data initialization period 320 and a retry failed requests period 322. In an embodiment, data initialization period 320 may be a period of time while a management module of enclosure controller 302 is a standby module, and retry failed requests period 322 may be a period of time while the management module of the enclosure controller is an active module.

In response to a start-up of an information handling system, data pump 312 may start plugins 314 as indicated by arrow 330. Based on the start 330, enclosure controller 302 may enter data initialization period 320 and plugins 314 may provide an attribute request 332 to backend processes 316. In response to the attribute request 332, backend processes 316 may provide attribute data 334 to plugins 314. In an example, attribute data 334 may be associated with components of the information handling system, such as servers, power supplies, cooling fans, or the like. Plugins 314 may make additional requests for data. For example, plugins 314 may provide an IOM request 336 to backend processes 316. In response to the IOM request 336, backend processes 316 may provide IOM data 338 to plugins 314. Similarly, plugins 314 may provide a DM request 340 to backend processes 316. In response to the DM request 340, backend processes 316 may provide DM data 342 to plugins 314. Additionally, plugins 314 may provide a LC Log request 344 to backend processes 316. In response to the LC Log request 344, backend processes 316 may provide LC Log data 346 to plugins 314. In an example, plugins 314 may make all of the requests 332, 336, 340, and 344 in parallel to backend processes 316.

In an example, the reception of attribute data 334, IOM data 338, DM data 342, and LC data 346, may cause plugins 314 to provide one or more sets of event data 348 to data pump 312. Data pump 312 may then provide one or more sets of event data 350 to stack 310 based on received event data 348. The reception of event data 350 may cause stack 310 and enclosure controller 302 to store a substantial amount of data, such as attributes of the information handling system, while enclosure controller 302 and its associated management module are in a standby mode. However, not all of the requests 332, 336, 340, and 344 may be successful, such that some attributes within stack 310 may be empty while the enclosure controller 302 is in a standby mode.

In response to a system active signal 352, enclosure controller 302 may enter retry failed requests period 322 and backend processes 316 may provide one or more ready signals to plugins 314. For example, backend processes 316 may provide a shared memory ready 354 and a DM ready 356. Plugins 314 may then provide a request retry 358 to backend processes 316. In an embodiment, request retry 358 may be for any requests for attributes that failed while enclosure controller 302 was in a standby mode. In response to the request retry 358, backend processes 316 may provide the retry data 360 to plugins 314.

The ready signals 354 and 356 and retry data 360 may cause plugins 314 to provide event data 362 and a ready signal 364 to data pump 312. Data pump 312 may then provide a ready signal 366, which in turn may cause enclosure controller 302 to enter a ready state 368. In response to the ready state 368, enclosure controller 302 may provide an mDNS signal 370 to memory manager 304. The mDNS signal 370 may indicate that enclosure controller 302 is active and in a ready state. At this point, memory manager 304 may communicate with enclosure controller 302 by sending requests 332 to stack 310, which in turn may provide responses 374 to the requests. Additionally, while enclosure controller 302 is active, backend processes 316 may continually receive updated events 376 and provide those events to plugins 314. In response to the events 376, plugins 314 may provide event data 378 to data pump 312, which in turn provides event data to stack 310.

Figure 4:
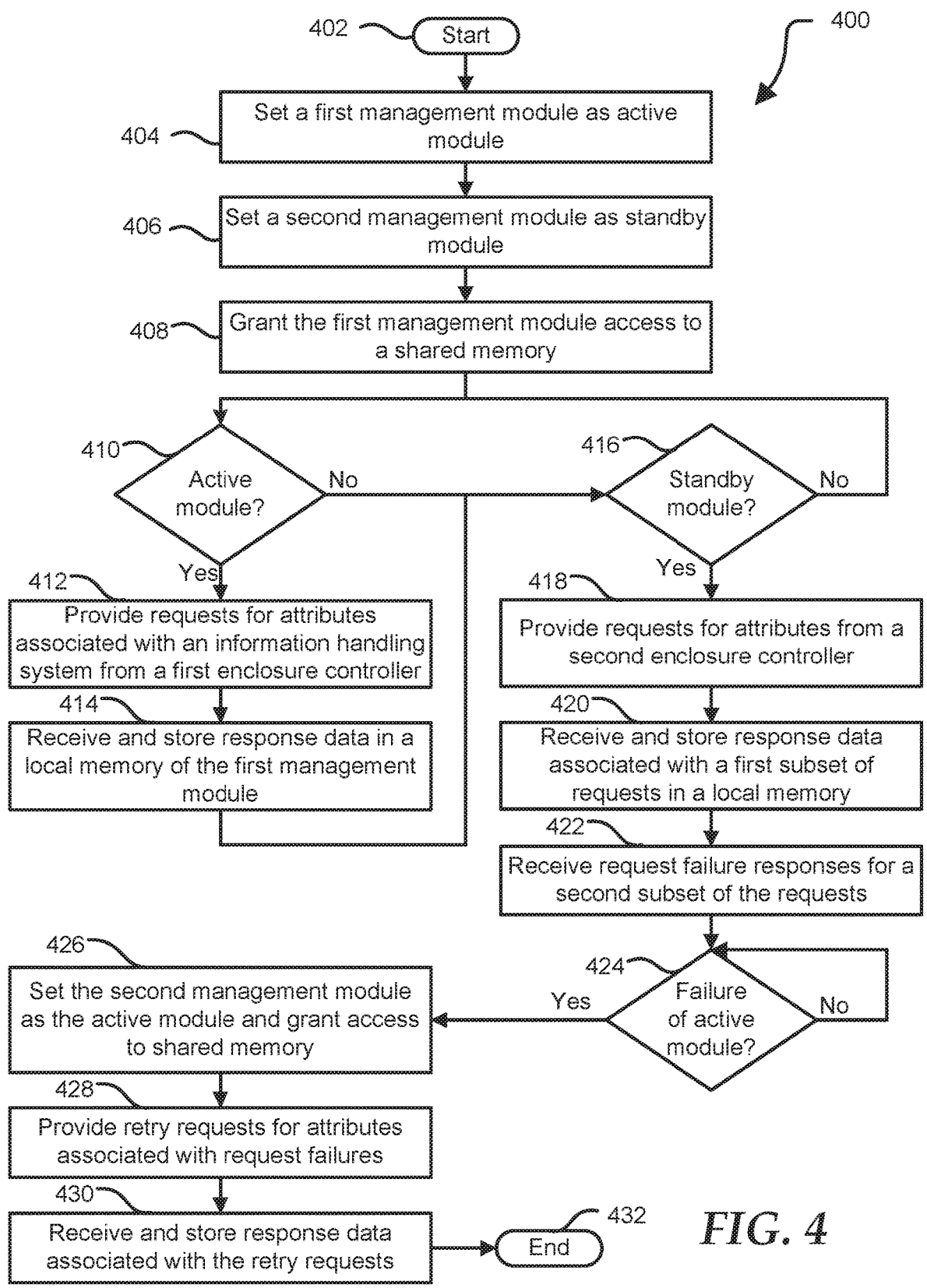
FIG. 4 is a flow diagram illustrating a method for implementing a failover in a redundant management module configuration of an information handling system according to at least one embodiment of the disclosure.

FIG. 4 shows a method 400 for implementing a failover in a redundant management module configuration of an information handling system according to at least one embodiment of the disclosure, starting at block 402. It will be readily appreciated that not every method step set forth in this flow diagram is always necessary, and that certain steps of the methods may be combined, performed simultaneously, in a different order, or perhaps omitted, without varying from the scope of the disclosure. FIG. 4 may be employed in whole, or in part, by information handling system 100 depicted in FIG. 1, information handling system 200 described in FIG. 2, or any other type of system, controller, device, module, processor, or any combination thereof, operable to employ all, or portions of, the method of FIG. 4.

At block 404, a first management module is set as an active module of an information handing system. At block 406, a second management module is set as a standby module of the information handling system. In certain examples, the first and second management modules may be configured as a set of redundant management modules for the information handling system. In an embodiment, each of the management modules includes an enclosure controller, a local memory, and a memory manager. In an example, the memory manager may be any suitable manager including, but not limited to, a MegaRAID Storage Manager (MSM).

At block 408, the first management module is a granted access to a shared memory of the information handling system. In an example, the communication line to the shared memory may be a multiplexor controlled line, such that only one of the first and second management modules may access the shared memory at a time, and a control signal may indicate which management module is to be granted access.

At block 410, a determination is made whether a particular module is active. In response to a module being the active module, requests for attributes associated with the information handling system are sent by that module at block 412. In an example, attributes may be any suitable data associated with the information handling system including, but not limited to, system configurations, RPMs for one or more fans within the system, and current power usage of the system.

At block 412, response data is received and stored in a memory of the active management module and the flow continues at block 416. If the particular management module is not the active module at block 410, a determination is made whether the management module is the standby module at block 416. In response to a module being the standby module, requests for the attributes associated with the information handling system are sent by that module at block 418.

At block 420, response data for a first subset of the requests is received and stored in a memory of the standby management module. At block 422, request failure responses for a second subset of the requests are received and stored in a memory of the standby management module.

The request failure responses may be utilized by the enclosure controller of the standby management module when that module becomes active.

At block 424, a determination is made whether the active module has failed. In an example, a detection of the failure may be made in response to a heartbeat ping not being received from the active management module by the standby management module.

In response to the failure of the active module being detected, the standby module is set as the active module and this module is granted access to the shared memory at block 426. At block 428, retry requests for attributes associated with the request failure responses are provided. In an example, the retry requests may be automatically provided in response to the module being set as the active module. At block 430, response data associated with the retry requests are received and stored. In an example, the receipt of the response data may enable the new active module to have a complete state of the information handling system, which may cause the new active module to enter a ready state. The method ends at block 424.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module may include software, including firmware embedded at a processor or software capable of operating a relevant environment of the information handling system. The device or module may also include a combination of the foregoing examples of hardware or software. Note that an information handling system may include an integrated circuit or a board-level product having portions thereof that may also be any combination of hardware and software.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system, comprising:
   a shared memory to store a first plurality of attributes for the information handling system; and
   a first management module to communicate with the shared memory, the first management module including a first enclosure controller including a first local memory to store a first stack, and a first memory manager,
   wherein when the first management module is set as a standby module of the information handling system, the first enclosure controller to: provide a first plurality of requests for attribute data for the information handling system; receive first response data for attribute data associated with a first subset of the first requests; store the first response data in the first local memory of the first enclosure controller; and receive request failure responses associated with a second subset of the first requests, wherein the second subset of the first requests is directed to a subset of the attributes data for the information handling system stored in the shared memory,
   wherein when the first management module is set as an active module of the information handling system, the first management module is granted access to the shared memory, and the first enclosure controller to: provide retry requests for attributes associated with the request failure responses; receive second response data associated with the retry requests; and store the second response data in the first local memory of the first enclosure controller.

2. The information handling system of claim 1, wherein in response to the first management module being the active module, the first enclosure controller further to: provide second requests for update states of the attribute data associated with the first subset of the first requests; receive third response data for the update states of the attribute data associated with the first subset of the first requests; and store the third response data in the first local memory of the first enclosure controller.

3. The information handling system of claim 1, further comprising:

a second management module to communicate with the shared memory and with the first management module, the second management module including a second enclosure controller including a second local memory to store a second stack, and a second memory manager, wherein the second management module is an active module of the information handling system prior to a failure of the second management module.

4. The information handling system of claim 3, while the first management module is the standby module, the first enclosure controller further to: receive updated states for the attributes of the first response data from the second enclosure controller of the second management module; and store the updated states for the attributes in the first local memory.

5. The information handling system of claim 3, wherein the first management module to determine that a ping has not been received from the second management module for a predetermined amount of time, and in response to the ping not being received for the predetermined amount of time, detect the failure of the second management module.

6. The information handling system of claim 5, wherein in response to the detection of the failure of the second management module, the first management module to toggle a failed line to place the second management module in a standby mode.

7. The information handling system of claim 1, while the first management module is the active module, the second enclosure controller further to: in response to the storing of the second response data in the first local memory, provide a ready state signal to the first memory manager of the first management module; and in response to the ready state signal, grant the first memory manager access to the first stack stored within the first local memory.

8. The information handling system of claim 1, wherein the first stack is a Representational State Transfer stack for a Representational State Transfer interface on the first enclosure controller.

9. A method, comprising:
setting a first management module of an information handling system as a standby module of an information handling system;
while the first management module is the standby module:
providing, by a first enclosure controller, a first plurality of requests for attribute data for the information handling system;
receiving first response data for attribute data associated with a first subset of the first requests;
storing the first response data in a first local memory of the first enclosure controller; and
receiving request failure responses associated with a second subset of the first requests, wherein the second subset of the first requests is directed to a subset of the attributes data for the information handling system stored in a shared memory;
detecting a failure of a second management module, wherein the second management module was an active module prior to the failure;
in response to the failure of the second management module, setting the first management module as the active module; and
in response to the first management module being the active module:
granting the first management module access to the shared memory;
providing retry requests for attributes associated with the request failure responses;
receiving second response data associated with the retry requests; and
storing the second response data in the first local memory of the first enclosure controller.

10. The method of claim 9, further comprising:
in response to the first management module being the active module:
providing second requests for update states of the attribute data associated with the first subset of the first requests;
receiving third response data for the update states of the attribute data associated with the first subset of the first requests; and
storing the third response data in the first local memory of the first enclosure controller.

11. The method of claim 9, while the first management module is the standby module, the method further comprising:
receiving, by the first enclosure controller, updated states for the attributes of the first response data from a second enclosure controller of the second management module, wherein the second management module is the active module of the information handling system;
storing the updated states for the attributes in the first local memory.

12. The method of claim 9, further comprising:
while the first management module is the active module:
in response to the storing of the second response data in the first local memory, providing a ready state signal to a memory manager of the first management module; and
in response to the ready state signal, granting the memory manager access to a stack stored within the first local memory.

13. The method of claim 12, wherein the stack is a Representational State Transfer stack for a Representational State Transfer interface on the first enclosure controller.

14. The method of claim 9, wherein the detecting of the failure of the second management module further comprises: determining, by the first management module, that a ping has not been received from the second management module for a predetermined amount of time.

15. The method of claim 9, further comprising: in response to the detecting of the failure of the second management module, toggling, by the first management module, a failed line to place the second management module in a standby mode.

16. A method, comprising:
setting a first management module of an information handling system as an active module of the information handling system;
setting a second management module of an information handling system as a standby module of the information handling system;
in response to the first management module being the active module:
granting the first management module access to a shared memory of the information handling system;
providing, by a first enclosure controller, a first plurality of requests for attribute data associated with the information handling system;
receiving first response data associated with the first requests; and
storing the first response data in a first local memory of the first enclosure controller;
while the second management module is the standby module:

providing, by a second enclosure controller, a second plurality of requests for attribute data for the information handling system;

receiving second response data associated with a first subset of the second requests;

storing the second response data in a second local memory of the second enclosure controller; and receiving request failure responses associated with a second subset of the second requests, wherein the second subset of the second requests is directed to a subset of the attributes data for the information handling system stored in the shared memory;

detecting a failure of the first management module;

in response to the failure of the first management module, setting the second management module as the active module; and in response to the second management module being the active module:

granting the second management module access to the shared memory;

providing retry requests for attributes associated with the request failure responses;

receiving third response data associated with the retry requests; and storing the third response data in the second local memory of the second enclosure controller.

17. The method of claim 16, further comprising:

in response to the second management module being the active module:

providing third requests for update states of the attribute data associated with the first subset of the first requests;

receiving fourth response data for the update states of the attribute data associated with the first subset of the first requests; and storing the fourth response data in the first local memory of the first enclosure controller.

18. The method of claim 16, while the second management module is the standby module, the method further comprising:

receiving, by the second enclosure controller, updated states for the attributes of the second response data from the first enclosure controller of the first management module;

storing the updated states for the attributes in the second local memory.

19. The method of claim 16, further comprising:

while the second management module is the active module:

in response to the storing of the third response data in the second local memory, providing a ready state signal to a memory manager of the second management module; and in response to the ready state signal, granting the memory manager access to a stack stored within the second local memory.

20. The method of claim 19, wherein the stack is a Representational State Transfer stack for a Representational State Transfer interface on the first enclosure controller.

* * * * *